United States Patent [19]

Delorme

[11] 4,255,644
[45] Mar. 10, 1981

[54] MICRO-SOLDERING TOOL

[75] Inventor: Raymond L. Delorme, Bagnolet, France

[73] Assignee: Compagnie Internationale l'Informatique-CUU Honeywell Bull, Paris, France

[21] Appl. No.: 895,791

[22] Filed: Apr. 12, 1978

[30] Foreign Application Priority Data

Apr. 29, 1977 [FR] France ................................ 77 13025

[51] Int. Cl.³ ...................... B23K 3/02; H05K 13/04; H05B 3/24
[52] U.S. Cl. ................................ 219/233; 156/583.1; 156/583.2; 219/85 D; 219/85 F; 219/228; 219/243; 228/44.1 A; 228/179; 228/180 A
[58] Field of Search ....................... 219/221, 227–241, 219/243, 85 F, 85 D; 156/583, 583.1, 583.2; 228/179, 180, 180 A, 4.5, 1, 44.1 R, 44.1 A

[56] References Cited

U.S. PATENT DOCUMENTS

| 3,050,612 | 8/1962 | Eversole | 219/233 |
|---|---|---|---|
| 3,097,286 | 7/1963 | Luke | 219/235 X |
| 3,337,716 | 8/1967 | Krause | 156/583 X |
| 3,369,954 | 2/1968 | Femer | 156/583 |
| 3,425,887 | 2/1969 | Bowen | 156/583 X |
| 3,551,645 | 12/1970 | Stoll | 219/243 UX |
| 3,887,783 | 6/1975 | Comette | 219/85 F X |

FOREIGN PATENT DOCUMENTS

| 2218965 | 9/1974 | France | 219/233 |
|---|---|---|---|
| 2221225 | 10/1974 | France | 219/233 |
| 2306041 | 10/1976 | France | 219/233 |
| 416068 | 1/1967 | Switzerland | 219/233 |

OTHER PUBLICATIONS

"Solder Tip," by H. Carl, IBM Technical Disclosure Bulletin, vol. 10, No. 6, Nov. 1967, p. 853.

Primary Examiner—A. Bartis
Attorney, Agent, or Firm—Lowe, King, Price and Becker

[57] ABSTRACT

A tool for micro-soldering the connecting tags of an integrated circuit chip to corresponding terminals on a substrate by Joule heating includes a high conductivity bit having a planar bottom face adapted to contact the tags and press them against the terminals while applying sufficient heat to the tags to solder them to the terminals. The face has a perimeter and a centrally apertured portion adapted to receive and accommodate the circuit chip. The apertured portion forms a geometric loop on the planar face having opposite sides spaced from each other and adapted to contact the tags of the chip. A continuous high electrical conductivity flange extends upwardly from all portions of the perimeter of the face to provide rigidity to the bit.

A pair of high conductivity strips extend from facing segments of the flange for applying current to and removing current from the flange on opposite sides of the loop so that a pair of symmetrical current half loops extend about the face between the opposite sides thereof. Each strip has a reduced cross-sectional area symmetrical with the side of the face and removed from the intersection of the strip with the flange.

7 Claims, 4 Drawing Figures

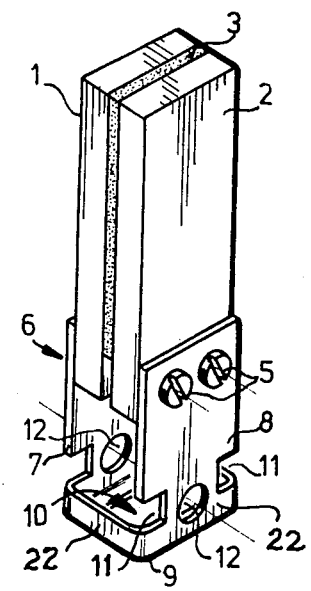
FIG:1
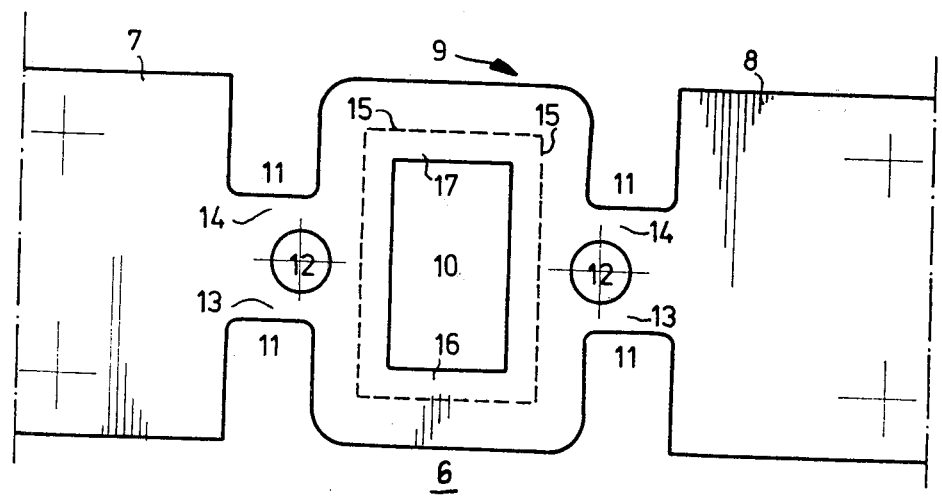
FIG:2

MICRO-SOLDERING TOOL

BACKGROUND OF THE INVENTION

The present invention relates to a soldering tool particularly adapted to effectively solder, in a single swift operation, connecting tags of an integrated circuit microwafer, i.e., a "chip", to corresponding ends, or terminals, of conductors carried by a substrate, such as a printed circuit board or the like.

In the prior art, the connecting tags have been soldered by a technique similar to that employed for the microwafer contacts. Frequently, ends of the connecting tags have been coated with a suitable soldering or brazing material. If the ends of the tags were not coated, at least the terminals of the conductors on the substrate have been coated with the brazing or soldering material, as have all of the conductors on the surface of the substrate. Also, the geometrical positions of the terminals correspond to the geometrical positions of the connecting tags on the microwafer.

In the soldering process, once the chip is positioned above the substrate, either in contact with it or at a very short distance from it, with the ends of the connecting tags situated above the terminals of the conductors, the soldering tool is lowered a "bit" on the tool presses the ends of the connecting tags against the terminals. Current is then applied to the bit and Joule effect heating of the bit causes the soldering material on the tags to melt, whereby soldering takes place. The tool is then raised back to its initial position. This process is preferably automated, in the prior art and in the present invention.

For the method to be effective, the soldering tool needs to have, in addition to satisfactory mechanical rigidity as far as soldering "bit" is concerned, the lowest possible thermal inertia and complete heating uniformity of the "bit" surface which bears against the connecting tags and terminals. The reason for this is to ensure that the localized melting of the soldering or brazing material is effective and sufficiently fast to prevent re-melting the previously soldered region attached to the other ends of the connecting tags to the terminals on the chip (even if the melting point of the first material is higher than that of the second material).

The object of the invention is to provide a micro-soldering tool which completely satisfies the above requirements and to a method of making same.

A prior art micro-soldering tool which operates by Joule effect comprises a pair of conductive metal or alloy uprights which sandwich an insulating strip between them. These uprights are respectively connected to the poles of a current generator. The sandwich forms the shank of a soldering bit with which it is mechanically and electrically connected. The soldering bit is generally rectangular and made of a material selected from the group consisting of tantalum, titanium, molybdenum and tungsten or their alloys. In one embodiment, described in French patent application Ser. No. 75.10132, filed on April 1, 1975 by Compagnie Honeywell Bull for a "Soldering Tool Operating by Joule Effect," the rectangular bit comprises a small plate, having a roughened surface; the plate is connected to the two uprights of the current supply sandwich by lateral side pieces which, together with the bit, are machined from a sheet of a material selected from the above mentioned group. The sheet is cut and then folded so that the side pieces which are attached to the outer faces of the uprights support the soldering bit at a suitable distance from the lower face of the sandwich. Advantageously, the bit is then machined to define the surface which is applied to the chip. The machining assists in enabling heat to be substantially uniformly applied to the chip by creating higher electrical resistance "border" around the bit, which border thus heats up more rapidly. To increase the speed of heating and cooling (when the current is switched off) the side pieces may be cut in the shape of a trapezoid having a minor base bordering on the bit.

BRIEF DESCRIPTION OF THE INVENTION

The soldering tool according to the present invention also employs the principle of construction of the prior art. The prior art structure is, however, not adapted to solder connecting tags to terminals which are "peripheral" with respect to the chip. In accordance with the present invention, to accomplish this result, the center of the prior art bit is cut-away to accommodate the chip and to apply pressure only to the ends of the connecting tags.

The invention is thus directed to a tool for micro-soldering connecting tags on an integrated circuit chip of corresponding terminals of conductors on a substrate by Joule heating. The tool comprises a high electrical conductivity bit having a bottom planar face adapted to contact the tags and press them against the terminals while applying sufficient heat to the tags to solder them to the terminals. The face includes a perimeter and centrally apertured portion adapted to receive and accomodate an integrated circuit chip. The apertured portion forms a geometric loop on said planar face. The loop has opposite sides spaced from each other which are adapted to contact connecting tags of the integrated circuit chip. Upstanding, high electrical conductivity side wall means extend from all portions of the perimeter of said face substantially at right angles to the face to provide rigidity to the bit. A pair of high electrical conductivity strips extending from the first and second facing segments of the wall means apply current to and remove current from the wall means on opposite sides of the loop so that a pair of symmetrical current half loops extend about the face between the opposite sides. Each of said strips has a reduced cross-sectional area in proximity with its intersection with its associated wall means segment. The reduced cross-sectional area of each strip is symmetrical with respect to the center of the side of the face with which the strip is associated.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a perspective view of a soldering tool in accordance with at least some of the features of the invention.

FIG. 2 is a partially developed plan view of the heating part of the tool, and

DETAILED DESCRIPTION OF THE INVENTION

Figure 3:
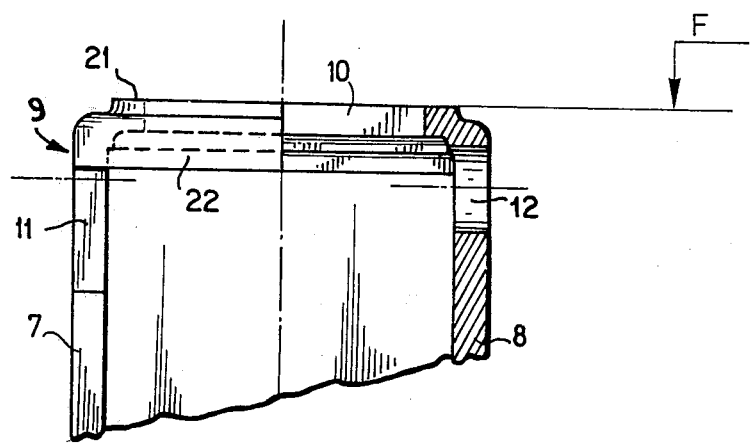
FIGS. 3 and 4 are enlarged views, partly in section, of lateral faces of the bit with the side portions of the heating section folded.

The micro-welding tool shown in FIG. 1 comprises a shank including a pair of relatively heavy metal or alloy high electrical conductivity upright bars 1 and 2 connected to opposite terminals of a suitable electric power source. Strip 3 of electrical insulating material is sandwiched between bars 1 and 2. Alternatively, the shank assembly could be achieved with a plastic bonding agent impregnated into the strip material by polymerizing the bonding agent. Screws 5 connect the shank to side pieces 7 and 8 of heating portion 6 of the tool so the side pieces and shank can be easily separated from each other. Heating portion 6 includes bit 9, preferably made of a material selected from the group consisting of tantalum, titanium, molybdenum and tungsten or their alloys. Bit 9 is adapted to engage and solder tags to terminals that are peripheral to an integrated circuit chip; the lower ends of side pieces 7 and 8 are connected together by bit 9. Bit 9 has a cut-away center 10 to accommodate the integrated circuit chip and apply pressure only to the ends of the connecting tags. As seen in FIG. 2, the combination of side pieces 7 and 8 and bit 9 are cut from a strip made of a metal, such as tantalum. The strip is shaped by folding and, if necessary, by stamping to a final configuration shown in FIG. 1. In the embodiment shown, side pieces 7 and 8 are vertical and flat and boardly rectangular in shape. If necessary, the side pieces 7 and 8 could be inclined (if the sides of the bit parallel to the thickness of the sandwich of the shank were narrower than this thickness) or the side pieces could be cut away so the surfaces thereof are trapezoidal (if the corresponding side of the bit were narrower than the sandwich).

The cross-section of each of side pieces 7 and 8 is reduced by cut-outs 11, on opposite sides of the vertical axis of symmetry of each of the sides, and in the region where the side piece is connected to bit 9. The lower edges of cut-outs 11 also define the upper edges of the bit 9. An intermediate cut-out 12, preferably having a circular shape because this shape causes less reduction in mechanical strength, is formed in the narrow portion of side pieces 7 and 8 between facing cut-outs 11 so it encroaches into side wall 22 of bit 9. Each of cut-outs 12 forms two current paths 13 and 14 which are symmetrical about the vertical axis of side pieces 7 and 8. Cut-outs 12 create four small area, high resistance, preferential heating points where heating current enters and leaves bit 9 since the resistance of the circuit rises abruptly at these points. Bit 9 is thus virtually divided into half-loops 16 and 17, FIG. 2, having balanced heat distribution that is achieved virtually instantaneously when current is applied.

Figure 4:
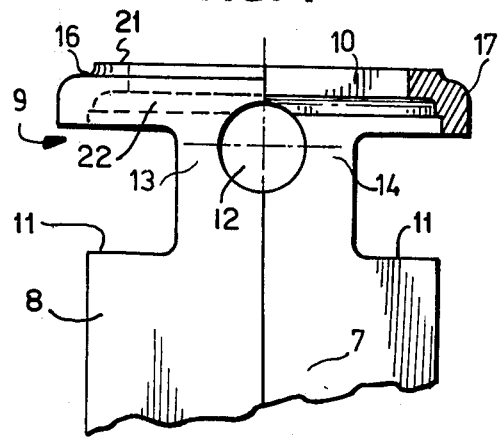

Fold lines 15 (FIG. 2) are provided on the blank that is initially used to produce heating element 6. The blank is folded along lines 15 and stamped to form the lateral cut-outs 11, as illustrated in FIGS. 3 and 4. Bit 9 is manufactured from a rectangular blank by perforating the blank to form center 10 and circular apertures 12; the blank is also stamped to form lateral cut-outs 11. Then the blank is folded along dashed lines 15 so that a bottom face 21 (FIGS. 3 and 4) including half-loops 16 and 17 is co-planar with center 10, and side walls 22 (FIG. 1) extend from the bottom face.

As seen in FIGS. 3 and 4, the bottom face 21 of bit 9 which is applied to the ends of the connecting tags on the chip for the soldering operation has been further machined to improve the match between the surface of face 21 of bit 9 and the surface formed by the outside of the connecting tag ends in the plane where they are brought by the pressure from the tool. Bottom face 21 produced by this machining is ground as required.

An important feature of the construction is that the loops in the lateral arms including half loops 16 and 17 of the bit 9 are constricted in the hatched regions of FIGS. 3 and 4 to form preferred heating points formed by half-loops 16 and 17, which is added to the effect achieved by loops 13 and 14 obtained by cut-outs 12. It is quite clear that these preferred heating paths are similarly balanced. If the connecting tags are located only along two opposite sides of the chip so that only half loops 16 and 17 abut against a load to be heated, the balanced, preferred heating paths remain intact. Hence, the formation of the reduced cross-section paths may be assisted by the requisite degree of machining of this nature solely in half loops 16 and 17.

It is obvious that the heating of the tool is a function of the electrical power which is applied during a given period, which may possibly be monitored by some suitable means, such as an infrared thermocouple.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A tool for micro-soldering connecting tags of an integrated circuit chip to corresponding terminals of conductors on a substrate by Joule heating comprising a high electrical conductivity bit having a bottom planar face adapted to contact the tags and press them against the terminals while applying sufficient heat to the tags to solder them to the terminals, said face having a centrally apertured portion adapted to receive and accomodate an integrated circuit chip, said apertured portion forming a geometrical loop on said planar face, said loop having first and second opposite sides spaced from each other and adapted to contact the connecting tags of the integrated circuit chip, first and second high electrical conductivity strips extending from first and second intersections with first and second opposite sides of the bit, said first and second strips respectively applying and removing current from the opposite sides of the face so that a pair of symmetrical current half loops extend about the geometrical loop between said opposite sides, each of said strips having a reduced cross-sectional area in proximity with its intersection with the bit, said bit having a continuous upstanding peripheral flange to provide rigidity to the bit, the reduced cross-sectional area of said first and second strips being respectively symmetrical with respect to said first and second sides and being removed from the intersection of the strip with the bit so that cross-sectional area of the reduced area is less than the strip at its intersection with the bit 2. The tool of claim 1 wherein the reduced cross-sectional areas of first and second strips respectively include a pair of spaced regions and are arranged such that current respectively flows between said first and second strips and said first and second sides of said bit through the pair of spaced regions.

3. The tool of claim 2 wherein the reduced cross-sectional area is formed between a pair of lateral cuts in opposite edges of the strip and by an aperture through a center line of the strip.

4. The tool of claim 3 wherein the aperture is circular.

5. The tool of claim 4 wherein the aperture center is closer to the face than a center line of the lateral cuts, whereby a portion of the aperture encroaches into the peripheral flange of the bit.

6. A tool for micro-soldering connecting tags of an integrated circuit chip to corresponding terminals of conductors on a substrate by Joule heating comprising a high electrical conductivity bit having a bottom planar face adapted to contact the tags and press them against the terminals while applying sufficient heat to the tags to solder them to the terminals, said face having a perimeter and centrally apertured portions adapted to receive and accommodate an integrated circuit chip, said apertured portion forming a geometric loop on said planar face, said loop having oposite side spaced from each other and adapted to contact connecting tags of the integrated circuit chip, upstanding high electrical conductivity side wall means extending from all portions of the perimeter of said face substantially at right angles to the face, said side wall means providing rigidity to the bit, a pair of high electrical conductivity strips extending from first and second facing segments of the side wall means for applying current to and removing current from the side wall means on opposite sides of the loop so that a pair of symmetrical current half loops extend about the face between said opposite sides, each of said strips having a reduced cross-sectional area in proximity with its intersection with its associated side wall means segment, the reduced cross-sectional area of each strip being symmetrical with respect to the center of the side of the face with which the strip is associated.

7. The tool of claim 6 wherein each reduced cross-sectional area is removed from the intersection of the strip with the side wall means so that the cross-sectional area of the reduced area is less than the strip area at its intersection with the side wall means.

* * * * *